Figure 1:
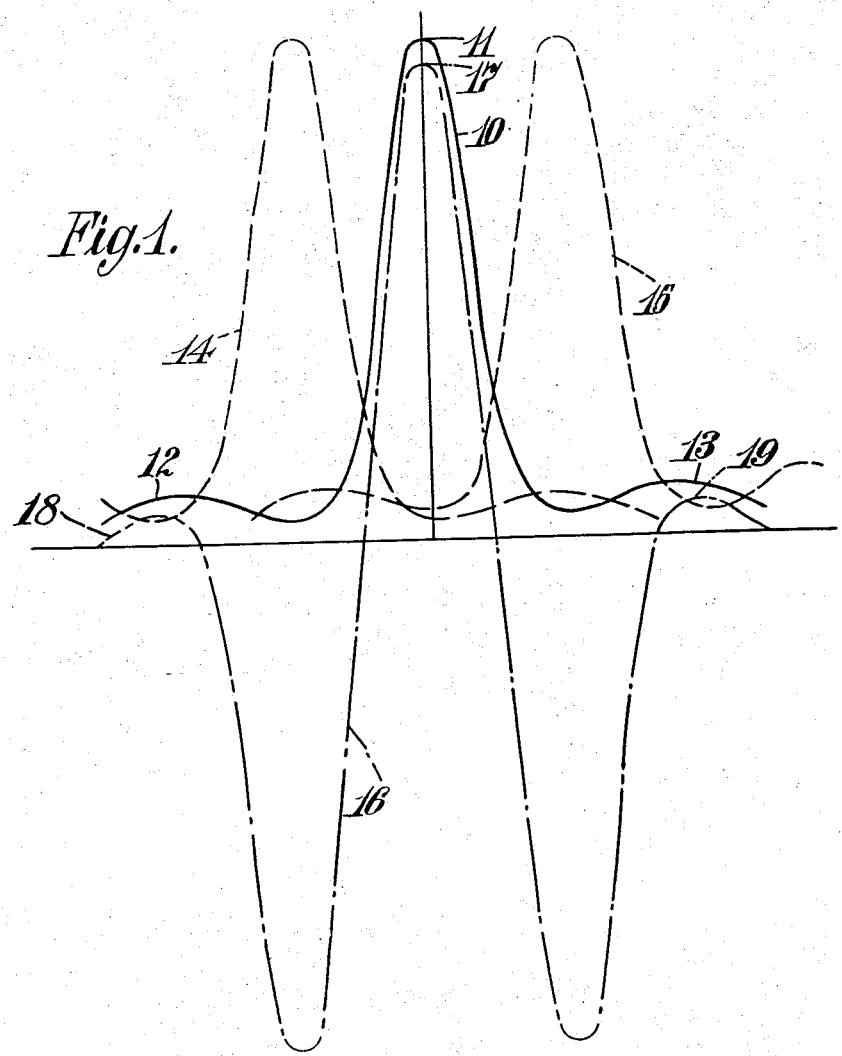

Inventors
R. F. HANSFORD
E. PARKER
By Mawhinney + Mawhinney
Attorneys

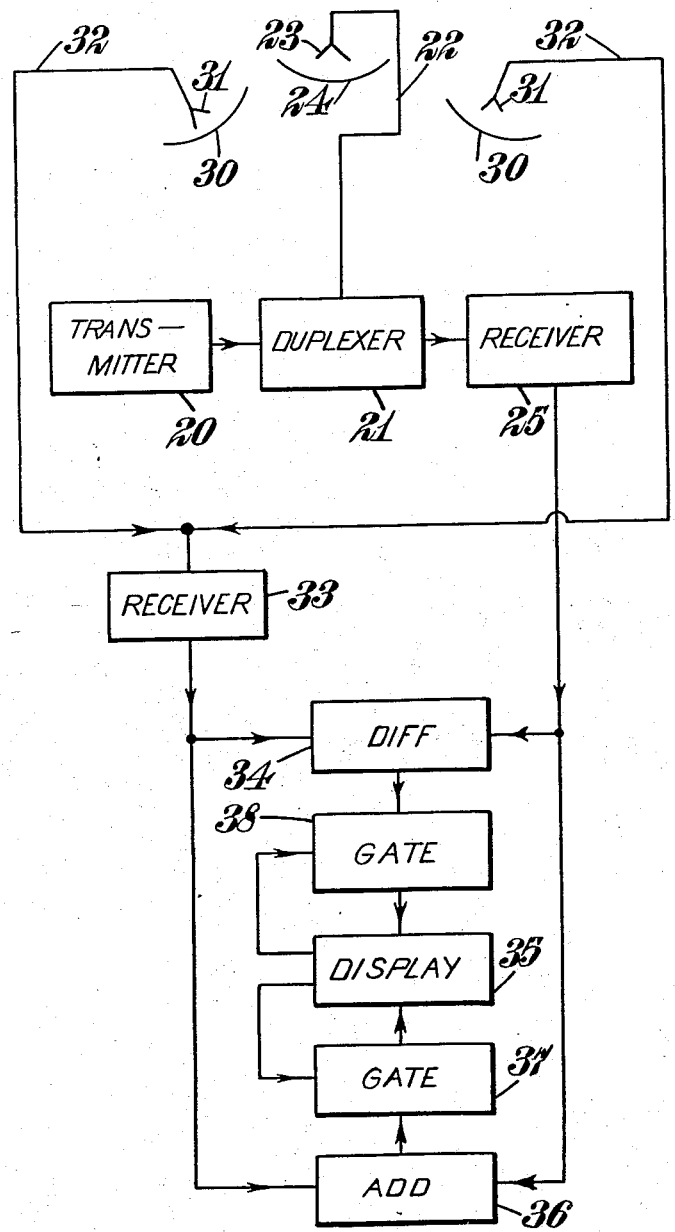

3,000,007
RADAR SYSTEMS
Reginald Frederick Hansford and Eric Parker, London, England, assignors to The Decca Record Company Limited, London, England, a British company
Filed Apr. 30, 1956, Ser. No. 581,540
Claims priority, application Great Britain May 2, 1955
11 Claims. (Cl. 343—5)

This invention relates to radar systems employing directional transmitting and receiving antennae.

One of the problems in radar apparatus is to obtain a narrow directional beam and to suppress side-lobe echoes without employing an unduly large antenna system. It is an object of the present invention to provide improved means for enabling the effective beam-width of a radar directional receiving antenna system to be reduced and/or to enable side-lobe echoes to be suppressed or reduced.

According to this invention, a radar system comprises a transmitter, a directional transmitting antenna system, a main directional receiving antenna system consisting of a reflector or lens and an associated receptor element for picking up received signals after reflection from said reflector or refraction through said lens, said reflector or lens and said receptor element being arranged to provide a directional receiving beam having its beam axis directed in the same direction as the transmitting beam axis, an auxiliary directional receiving antenna system comprising a reflector or lens and a separate receptor element and arranged to provide a directional receiving beam or beams directed at an angle offset from the main beam in a direction where the main beam width is to be reduced or the side lobe is to be suppressed or reduced, a first receiver coupled to the receptor element of said main receiving system and arranged to produce a first rectified video output, a second receiver coupled to the receptor element of said auxiliary directional receiving system and arranged to produce a second rectified video output, means for combining the two video outputs in a subtractive manner and an indicator for displaying the combined video outputs. By using directional auxiliary receiving antenna systems in this manner, it is possible to obtain video signals which, when combined with the signals from the main receiving antenna system, will reduce side lobe echoes or will narrow the effective width of the main beam without substantially detracting from the performance in the centre of the main beam.

For a radar system in which directional discrimination in azimuth is required, it would generally be desirable to provide two auxiliary receiving antennae arranged to provide directional beams off-set on either side of the main beam. In this case the second receiver may comprise separate rectifiers for separately rectifying the signals received by the two auxiliary receiving systems and means for combining the rectified signals to produce said second rectified video output. However, if two or more auxiliary receiving systems are provided employing a common reflector or lens, the second receiver may be coupled to the receptor elements of all said auxiliary receiving systems. In this latter case the combination of the signals from the auxiliary receiving systems may be effected at the radio frequency or at an intermediate frequency after frequency changing or at the video frequency.

In some radar systems, it is desirable to have a sharp directional discrimination in elevation as, for example, when it is required to see targets at relatively low angles of elevation but to avoid ground clutter. In this case a single auxiliary receiving antenna system may be arranged having its directional beam pointed at a lower elevation than that of the main beam.

When receiving long range radar signals, the signal strength is usually so small that side lobes are not troublesome but it may be important to obtain the maximum signal strength. For this reason, there may be provided means for additively combining the video outputs of said first and second receivers and switching means for applying the additive combination to said indicator in place of the subtractive combination when signals from targets beyond a predetermined range are to be displayed.

The arrangement of the present invention finds particular application in radar systems working at frequencies of above about 2,000 mc./s. At such frequencies, by the use of wave guide components and wave guide feeds coupled to receptor elements, it is possible to obtain sharply directional beams with antennae having aperture dimensions of only a few feet and the arrangement of the present invention enables a further substantial improvement to be obtained.

The receptor elements may conveniently comprise horns or polyrods.

A common reflector may be used for the main and auxiliary receiving antenna systems. In one arrangement, for example, in a radar system in which azimuthal discrimination is required, a reflector may be employed having a parabolic section in a horizontal plane and having a first horn forming the receptor element of the main directional receiving system and having two other horns disposed on either side of the first horn and forming the receptor elements for auxiliary receiving systems. In some cases, however, it may be preferred to use separate reflectors for the main and auxiliary antenna systems and, in the case of a radar for determining azimuthal bearings, such separate reflectors may conveniently be arranged one above the other. It would be possible to use a single reflector with two receptor elements to form the two auxiliary receiving systems and to use a second reflector for the main receiving system. Such an arrangement with separate reflectors will avoid any increase in side lobes due to the presence of additional horns in the main antenna system.

It will be appreciated, however, that it is not necessary to use horns with reflectors of parabolic section in one plane and, for example, a straight reflector with a slotted wave guide receptor element might be used.

The reflector or lens and the receptor element of the main receiving antenna system may be used for the transmitting antenna system by employing a duplexer in the known manner.

The directions of the auxiliary beams with respect to the main beam may be set according to requirements. Furthermore, the relative amplitudes of the two video outputs may be adjusted before they are combined and by such means the effective polar diagrams of the receiving system may be varied within limits as required. If desired swept gain control may be applied so that the relative amplitudes of the signals depend on the range. As one example, for obtaining azimuthal discrimination, if the main receiving antenna system has a sharp main beam with an associated pair of main side lobes, the auxiliary beams may conveniently be directed in the direction of the minima between the main beam and the two side lobes. By this arrangement the signals received on the auxiliary antenna system may serve both to reduce the side lobes and to reduce the beam width of the main beam. It will be noted that there is no need to match the gains of the two amplifiers and that the relative directions of the various antenna systems are not critical.

Figure 3:
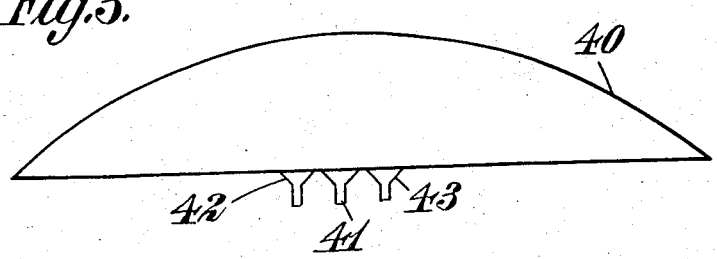

The following is a description of one embodiment of the invention reference being made to the accompanying drawings in which FIGURE 1 is a graphical diagram explaining the invention;

FIGURE 2 is a block diagram of a pulse radar apparatus embodying the invention; and FIGURE 3 is a plan view of an antenna.

In FIGURE 1 there is represented by the curve 10, drawn in a full line, the directional pattern of a radar receiving antenna, the diagram showing the received amplitude or ordinate plotted against angular direction. It will be seen that the curve 10 has a main lobe with a peak at 11 and also side lobes 12, 13. With the types of antenna commonly employed in microwave radar systems for producing a highly directional beam which is scanned, such side lobes are almost invariably obtained. It will further be noted that the amplitude of the received signal does not fall to zero between the main lobe and the side lobes. Thus if a very strong signal is obtained, it will appear on the radar display as a response over a very wide arc extending not only for the angular width of the main lobe but also over two or more side lobes.

Also shown on FIGURE 1 are curves 14, 15, drawn in dash lines, representing the amplitudes of received signals plotted against angular direction for two similar antennae having their main beams displaced on either side of the main beam of the antenna having the directional pattern represented by curve 10. If the signals received by the two antennae having directional patterns represented by the curves 14, 15 are combined additively and then subtracted from the signal from the antenna having the directional pattern represented by the curve 10, the resultant signal has a relationship between signal strength and angular direction indicated by the chain dotted line 16. It will be noted that the curve 16 represents a single main directional beam with a peak at 17 coincident in angular direction with the main beam of the pattern represented by the curve 10 but the angular width of the beam represented by curve 17 is appreciably narrower than that of curve 10. The curve 16 has two minor side lobes 18, 19 which, however, are of smaller amplitude than those of any of the single antennae. It is possible, however, by having different adjustments from those employed in deriving the curve shown, to remove wholly the side lobes. Between the main beam and the side lobes 18, 19 the curve 16 has negative portions, i.e. portions below the horizontal axis of the diagram, indicating that the resultant output signal from these angular directions is of opposite polarity to that in the main beam. Thus, if the resultant signals represented by the curve 16 are applied as video signals to brighten the trace of a cathode ray tube, the signals from directions represented by portions of the curve above the axis would be of a polarity to brighten the trace on the screen of the tube and signals from directions represented by the portions below the axis would not shown on the display.

It will be particularly noted that, because of the negative going portions of the curve 17, no matter how strong were the received signals, responses on the radar display would not have an angular width greater than that represented by the part of the curve 16 above the horizontal axis on FIGURE 1. Thus, in a plan position indicator display, no matter how great is the signal strength, the angular width of the arc representing the response on the display can only reach a certain maximum value. As previously mentioned, the effective beam width of the curve 17 is appreciably less than that obtained from any one of the three individual antennae employed and, moreover, the side lobes are reduced and displayed further away from the main beam in the angular direction. As previously indicated, however, the side lobes may be completely eliminated.

FIGURE 2 shows one embodiment of pulse radar apparatus for obtaining the narrow beam width and the side lobe suppression described with reference to FIGURE 1. In FIGURE 2 there is shown a pulse transmitter 20 which produces short duration microwave pulses which are fed through a duplexer 21 into a wave guide connection 22 to a horn 23 or polyrod or like transmitter element associated with a reflector 24. The transmitter element 23 and reflector 24 together form the transmitting antenna system and also serve as the main receiving antenna system, the received signals being fed from the horn 23 through the duplexer 21 to a receiver 25. The receiver 25, in a typical arrangement, may comprise a local oscillator and mixer stage to produce intermediate frequency signals which are amplified in an intermediate frequency amplifier and then detected to produce a video output.

There are also provided two auxiliary receiving antennae which each comprise a reflector 30 and a horn or like receptor element 31. The signals received by these two auxiliary antennae are fed by wave guide feeds 32 to a receiver 33 where the two received signals are additively combined. If the two receptor elements 31 have a common reflector 30, the receiver 33 may comprise a single local oscillator and mixer stage to produce intermediate frequency signals which are amplified in an intermediate frequency amplifier and then detected to produce a video output, the combination of the signals from the two auxiliary antennae being effected at the radio frequency by feeding the two signals into the common input to the receiver. Alternatively, there may be separate radio frequency and mixer stages and the signals may then be combined at the intermediate frequency. If, however, the receptor elements 31 have separate reflectors 30, the combination has to be made at the video frequency. The video outputs from the two receivers 25 and 33 are subtracted in a difference unit 34 to produce a single output which is then fed to a display unit 35.

When receiving long range radar signals, the signal strength is usually so small that side lobes are not troublesome but it may be important to obtain the maximum signal strength. In this case, an addition unit 36 may be provided for adding the outputs from the receivers 25 and 33 and gate circuits 37, 38 controlled by the display time base provided for switching the display unit 35 to the difference unit 34 at times corresponding to shorter range signals and to the addition unit 36 at times corresponding to longer range signals.

The main antenna system and the two auxiliary antennae systems would be rotated or turned to scan in synchronism so as to preserve the angular relationship of the beams and most conveniently all the antennae systems are arranged on a common mounting. For example, in a radar system for determining the plan position of targets, the two auxiliary antennae would be arranged with their beams offset on either side of that of the main antenna in the azimuthal plane and all the antennae may be rotated continuously and the video output from the unit 34 fed to a plan position indicator.

It will be seen that the signals fed to the display 35 from the difference unit 34 will have an amplitude which varies with angular direction in the manner shown by the curve 16 in FIGURE 1 provided that the auxiliary antennae are properly set in the angular directions on either side of the main beam of the main antenna system. The form of the resultant effective directional pattern may be adjusted by suitable adjustment of the angular directions of the auxiliary antennae and also by adjustment of the relative gain in the receivers 25 and 33. One or both of these receivers may have a swept gain control so that the relative amplitudes of the combined signals depends on the range.

Conveniently a single reflector is used both for the main and auxiliary antenna systems and one such arrangement is shown in FIGURE 3 which is a plan view of a cheese antenna having a parabolic reflector 40 with a central horn 41 (corresponding to the horn 23 in FIGURE 2) and with two auxiliary horns 42, 43 on either side of the central horn (corresponding to the horns 31 of the auxiliary antennae of FIGURE 2). In some cases however, in order to avoid the horns of the auxiliary antennae system interfering with the directional transmitting pattern produced by the horn 41, it may be preferred to use one reflector for the main antenna system and a separate reflector for the two auxiliary antenna systems. In this case, conveniently two cheese reflectors may be arranged one above the other with the horn 41 feeding one of the reflectors and the horns 42, 43 feeding the other reflector.

Although reference has been made particularly to the use of horns feeding reflectors, it will be appreciated that other types of receptor elements, e.g. slotted waveguides, may be employed and also that lenses may be used instead of reflectors.

In a radar system for determining elevation using a beam sharply directional in the vertical plane, it may be desired to have a very sharp cut-off at the lower edge of the beam to avoid ground reflections and it may also be important to make sure any lower side lobe is suppressed. In such an arrangement the upper edge of the beam and the upper side lobe may not be of great importance and, in this case, an arrangement similar to that of FIGURE 2 but with only one auxiliary antenna may be employed to give the required directional pattern in the vertical plane.

We claim:

1. A radar system comprising a transmitter, a directional transmitting antenna system, a main directional receiving antenna system consisting of a focussing device and an associated receptor element at the focal point of said focussing device for picking up received signals brought to the focal point by said focussing device, said main directional receiving antenna system being arranged to provide a directional receiving beam having its beam axis directed in the same direction as the transmitting beam axis, an auxiliary directional receiving antenna system comprising a focussing device and a separate receptor element and arranged to provide a directional receiving beam directed at an angle off-set from the main beam in a direction where signals picked up by the main antenna system are to be reduced, a first receiver coupled to the receptor element of said main receiving system and arranged to produce a first rectified video output, a second receiver coupled to the receptor element of said auxiliary directional receiving system and arranged to produce a second rectified video output, first means for combining the two video outputs in a subtractive manner, second combining means for combining the two video outputs in an additive manner, an indicator and switch means operative to feed to the indicator from said first combining means video signals from below a predetermined range and operative to feed to the indicator from said second combining means signals from targets beyond said predetermined range.

2. A radar system as claimed in claim 1 wherein two auxiliary receiving systems are provided having their directional beams off-set on either side of the main beam and wherein said second receiver comprises separate rectifiers for separately rectifying the signals received by the two auxiliary receiving systems and means for combining the rectified signals to produce said second rectified video output.

3. A radar system as claimed in claim 1 wherein at least two auxiliary receiving systems are provided having their directional beams off-set from the axis of the main beam, which antenna systems employ a common focussing device and wherein said second receiver is coupled to the receptor elements of all of said auxiliary receiving systems.

4. A radar system as claimed in claim 1 and having directional discrimination in elevation wherein a single auxiliary antenna system is provided having its directional beam pointed at a lower elevation than that of the main beam to give sharp directional discrimination at the lower edge of the main beam.

5. A radar system as claimed in claim 1 wherein the focussing device for said main directional antenna system comprises a reflector arranged also to constitute the focussing device for said auxiliary directional receiving antenna system.

6. In a radar system, receiving apparatus comprising a main directional antenna system consisting of a focussing device and a first receptor element at the focal point of said focussing device for picking up received signals brought to the focal point by said focussing device, an auxiliary directional receiving antenna system comprising a separate receptor element associated with said focussing device and arranged to provide a directional receiving beam directed at an angle off-set from the main beam in a direction where signals picked up by the main antenna system are to be reduced, a first receiver coupled to said first receptor element and arranged to produce a first rectified video output, a second receiver coupled to the receptor element of said auxiliary directional receiving antenna system and arranged to produce a second rectified video output, first combining means for combining said first and second rectified video outputs in a subtractive manner, second combining means for combining said first and second rectified outputs in an additive manner, a display unit, and switch means operative to feed to the display unit from said first combining means video signals from targets below a predetermined range and operative to feed to the display unit from said second combining means video signals from targets beyond said predetermined range.

7. Apparatus as claimed in claim 6 wherein said focussing device comprises a parabolic reflector.

8. Apparatus as claimed in claim 6 and including a transmitter and a duplexer, the duplexer being arranged to connect said transmitter to said first receptor element and to connect said first receptor element to said first receiver whereby said main directional antenna system may be used both for transmitting and receiving.

9. In a radar system, receiving apparatus comprising a main directional antenna system consisting of a focussing device with a first receptor element at the focal point thereof, second and third receptor elements associated with said focussing device and off-set in opposite directions from said focal point to provide directional receiving beams directed at angles off-set from the main beam, a first receiver coupled to said first receptor element and arranged to produce a first rectified video output, a second receiver coupled to both said second and said third receptor elements and arranged to produce a second rectified video output, first combining means for combining said first and second rectified video outputs in a subtractive manner, second combining means for combining said first and second rectified video outputs in an additive manner, an indicator and switch means operative to feed to the indicator from said first combining means video signals from below a predetermined range and operative to feed to the indicator from said second combining means signals from targets beyond said predetermined range.

10. Apparatus as claimed in claim 9 wherein each of said receptor elements comprises a horn and wherein said focussing device comprises a parabolic reflector.

11. In a radar system, receiving apparatus comprising a main directional antenna system consisting of a focussing device with a first receptor element at the focal point thereof, second and third receptor elements associated with said focussing device and off-set in opposite directions from said focal point to provide directional receiving beams directed at angles off-set from the main beam, a first receiver coupled to said first receptor element and arranged to produce a first rectified video output, a second receiver coupled to both said second and said third receptor elements and arranged to produce a second rectified video output, first combining means for combining said first and second rectified video outputs in a subtractive manner, second combining means for combining said first and second rectified outputs in an additive manner, a display unit, and switch means operative to feed to the display unit from said first combining means video signals from targets below a predetermined range and operative to feed to the display unit from said second combining means video signals from targets beyond said predetermined range.

References Cited in the file of this patent

UNITED STATES PATENTS

| | | |
|---|---|---|
| 2,426,183 | Deloraine et al. | Aug. 26, 1947 |
| 2,456,666 | Agate et al. | Dec. 21, 1948 |
| 2,585,173 | Riblet | Feb. 12, 1952 |
| 2,608,683 | Blewett | Aug. 26, 1952 |
| 2,687,520 | Fox et al. | Aug. 24, 1954 |
| 2,736,019 | Vogeley et al. | Feb. 21, 1956 |
| 2,759,154 | Smith et al. | Aug. 14, 1956 |
| 2,804,614 | Alvarez | Aug. 27, 1957 |
| 2,825,900 | Collbohm | Mar. 4, 1958 |